United States Patent [19]

Sydansk

[11] 4,352,395

[45] Oct. 5, 1982

[54] PROCESS FOR SELECTIVELY REDUCING THE PERMEABILITY OF A SUBTERRANEAN FORMATION

[75] Inventor: Robert D. Sydansk, Littleton, Colo.

[73] Assignee: Marathon Oil Company, Findlay, Ohio

[21] Appl. No.: 210,969

[22] Filed: Nov. 28, 1980

[51] Int. Cl.³ .......................................... E21B 33/138
[52] U.S. Cl. ..................................................... 166/292
[58] Field of Search ............... 166/281, 292; 405/263, 405/266

[56] References Cited

U.S. PATENT DOCUMENTS

| | | | |
|---|---|---|---|
| 2,146,754 | 2/1939 | Maness | 166/292 X |
| 2,264,037 | 11/1941 | Haskell | 166/292 X |
| 2,272,672 | 2/1942 | Kennedy | |
| 2,699,213 | 1/1955 | Cardwell et al. | 166/281 |
| 2,747,670 | 5/1956 | King et al. | |
| 2,832,415 | 4/1958 | Reistle | 166/292 |
| 3,193,007 | 7/1965 | Kiel | 166/292 X |
| 3,302,719 | 2/1967 | Fischer | 166/281 X |
| 3,530,937 | 9/1970 | Bernard | 166/292 X |
| 3,613,789 | 10/1971 | Son, Jr. | 166/281 |
| 3,614,985 | 10/1971 | Richardson | 166/292 X |
| 3,658,131 | 4/1972 | Biles | 166/292 |
| 3,805,893 | 4/1974 | Sarem | 166/270 |
| 3,837,400 | 9/1974 | Martin | 166/292 X |
| 3,871,452 | 3/1975 | Sarem | 166/270 |
| 4,233,015 | 11/1980 | Teague et al. | 405/263 |

*Primary Examiner*—Stephen J. Novosad
*Assistant Examiner*—George A. Suchfield
*Attorney, Agent, or Firm*—Jack L. Hummel

[57] ABSTRACT

A process for selectively reducing the permeability of a relatively highly permeable zone of a subterranean formation wherein an aqueous solution having an insoluble precipitate suspended therein is injected into the subterranean formation via a well bore penetrating the same.

8 Claims, No Drawings

PROCESS FOR SELECTIVELY REDUCING THE PERMEABILITY OF A SUBTERRANEAN FORMATION

DESCRIPTION

Technical Field

The invention relates to the process for selectively reducing the permeability of a subterranean formation, and more particularly, to a process for selectively reducing the permeability of a relatively highly permeable zone thereof to improve vertical conformance and flow profiles of fluids injected into or produced from the formation.

Background Art

In general, poor vertical conformance of fluids injected into or produced from a subterranean formation occurs where the formation exhibits a lack of vertical homogeneity. Fluid injected into or produced from a well penetrating the formation tends to preferentially channel or finger into areas of relatively high permeability, thus resulting in extremely poor vertical conformance and flow profiles. Further exemplary, relatively highly permeable zones, strata, beds, channels, vugs, or fractures, may be vertically juxtaposed to zones, strata, or beds of relatively low permeability at the subterranean location where fluids are to be injected or produced via a well bore. Fluid injected into or produced from the subterranean hydrocarbon-bearing formation will preferentially flow through the zones, strata, channels, vugs or fractures of relatively high permeability resulting in a relatively high residual hydrocarbon content in the remaining zones, strata, or beds of relatively low permeability.

Several prior art processes have been proposed to alleviate such preferential channeling or fingering, and thus, improve conformance and injection and/or production flow profiles. High molecular weight organic polymers and cross-linking agents, such as polyvalent cations, have been injected into a subterranean hydrocarbon-bearing formation. These injected fluids predominantly finger or channel into areas of relatively high permeability wherein the high molecular weight organic polymers are crosslinked and gelled. This gel plugs relatively highly permeable areas and improves conformance and flow profiles of injected and/or produced fluids. U.S. Pat. Nos. 3,805,893 and 3,871,452 to Sarem involve processes which utilize the sequential injection of a dilute aqueous alkaline alkali metal silicate solution, such as an aqueous solution of sodium and potassium orthosilicate, a spacer slug of relatively soft water, and an aqueous slug containing a reagent, such as, calcium and magnesium, which will react with the alkaline alkali metal silicate. The orthosilicate and the reagent react at a location distant from the well bore and form a relatively insoluble precipitate. As these injection fluids tend to channel into areas of relatively high permeability, such precipitates tend to plug the highly permeable areas distant from the well bore, and thus, improve conformance and flow profiles. U.S. Pat. No. 3,658,131 to Biles discloses another process for selectively plugging highly permeable channels in a hydrocarbon-bearing formation by injecting a fresh water slug as a spacer for a subsequently injected aqueous solution containing a 10–20 weight percent sodium silicate. The silicate will react with calcium cations present in formation water to form a relatively insoluble precipitate. U.S. Pat. No. 3,837,400 to Martin discloses plugging permeable channels in a water flooded oil zone by injecting a sodium hydroxide solution which is isolated from connate water by a slug of water low in metallic ions. At a distance from the well bore, the sodium hydroxide penetrates the water isolation slug and reacts with various metallic ions in the connate water, such as magnesium and calcium, to form low solubility precipitates which will plug the channels. U.S. Pat. No. 2,272,672 to Kennedy relates to a process for minimizing bypassing of water during water flooding process. One embodiment of the process involves the successive injection of an alkali and magnesium sulphate or chloride. The alkali and the magnesium sulphate or chloride reacts in situ to form a precipitate which plugs the more permeable strata. U.S. Pat. No. 2,402,588 to Andreson discloses a process for selectively plugging highly permeable strata of a subterranean hydrocarbon-bearing formation by injecting therein an aqueous alkaline solution of sodium silicate and a reagent, such as a weak acid, which slowly reduces the alkalinity of the solution to cause formation of a precipitate or gel. U.S. Pat. No. 3,530,937 to Bernard discloses a process for reducing the permeability of the more highly permeable strata of a subterranean hydrocarbon-bearing formation wherein two aqueous solutions are successively injected into the formation, each solution containing an agent which will react to form a plugging precipitate when brought into contact with each other in the reservoir. An aqueous spacing medium is injected between the two aqueous solutions. Examples of the two solutions are a solution of a water-soluble salt, including calcium and magnesium, and an alkaline solution, such as sodium hydroxide or sodium silicate. Where the formation contains mineral substances capable of reacting with either agent to form a precipitate, care is taken to select an agent which is inert to such mineral substances. U.S. Pat. No. 2,747,670 to King, et al discloses a similar process which involves the sequential injection of an aqueous salt solution, an inert spacing medium, e.g., water or brine, and an aqueous alkali solution into a subterranean formation to improve the permeability profile thereof. Calcium or magnesium salts and sodium hydroxide or sodium carbonate are preferrably employed in the successively injected aqueous solutions.

Most of these prior art processes involve the use of sequentially injected aqueous fluids to form a plugging precipitate in situ. These proposed prior art processes are relatively ineffective due in part to inefficient mixing of the sequentially injected fluids in situ and formation of the precipitate at a substantial distance from the well bore. Other processes which involve the use of high molecular weight polymers or resins tend to be expensive, and therefore, cost ineffective. In addition, the plugging gels formed in situ utilizing such polymers or resins tend to break down under subterranean formation conditions, and therefore, result in only temporary improvements in conformance and flow profiles. As all of these prior art processes involve the formation of plugging precipitates in situ, and hence are subject to relatively uncontrollable formation parameters, none of these prior art processes have proved totally effective in improving vertical conformance and flow profiles of fluids injected into and/or produced from the subterranean formation.

As such, a need still exists for a relatively simple, cost effective process for permanently and selectively reducing the permeability of relatively highly permeable zones of a subterranean formation so as to improve vertical conformance and flow profiles of fluids subsequently injected into or produced from the formation.

Disclosure of Invention

The present invention provides for a process for selectively reducing the permeability of a relatively highly permeable zone of a subterranean formation so as to improve vertical conformance and flow profiles of fluids subsequently injected into or produced from the formation. An aqueous solution having an insoluble precipitate suspended therein is injected into the subterranean formation via a well bore communicating therewith. The insoluble precipitate possesses the structural formula $M(OH)_n$, wherein $M^{n+}$ represents a polyvalent cation, such as, magnesium.

Best Mode for Carrying Out the Invention

The present invention relates to a process for selectively reducing the permeability of a relatively highly permeable portion of a subterranean hydrocarbon-bearing formation. The process of the present invention comprises injecting an aqueous solution having an insoluble precipitate suspended therein into a well bore penetrating the subterranean formation.

The insoluble precipitate has the following general structural formula, wherein $M^{n+}$ represents a polyvalent cation;

$$M(OH)_n \quad (1)$$

This precipitate is a highly hydrated, highly dispersed compound which when injected into a relatively highly permeable zone of a subterranean formation greatly reduces but does not completely prevent, fluid flow therethrough. The aqueous treating fluid having the precipitate dispersed therein can be formed by one of two methods. Preferably, the treating solution is formed by combining an aqueous solution having polyvalent cations dissolved therein with a caustic, aqueous solution. An insoluble precipitate is subsequently formed in accordance with the following general reaction (2), wherein M represents the polyvalent cation;

$$M^{n+} + nOH \rightarrow M(OH)_n \quad (2)$$

Caustic and polyvalent cations, should be present in their respective aqueous solutions in concentrations dictated by the stoichiometry of general reaction (2). Alternatively, a solid precipitate, usually commercially available in a powdered form, may be added to an aqueous solution as will be evident to the skilled artisan.

Where a caustic, aqueous solution is combined with an aqueous solution having polyvalent cations dissolved therein, the caustic utilized in one of the aqueous solutions may be any hydroxide ion generating compound, such as, sodium hydroxide, potassium hydroxide, lithium hydroxide or ammonium hydroxide, although sodium hydroxide is preferred for purposes of the present invention. Any polyvalent cation which can be dissolved in an aqueous solution, for example, calcium or magnesium may be employed in the other aqueous solution, although magnesium is highly preferred for purposes of the present invention. The polyvalent cation can be incorporated into the solution as a salt, such as, for example, magnesium chloride. The exact ionic make-up of any aqueous medium utilized to formulate any aqueous solution utilized in accordance with the present invention is not critical. Where a solid precipitate is added to an aqueous solution, commercially available magnesium hydroxide is preferably utilized. Magnesium hydroxide is a relatively inexpensive, stable, inorganic solid which is insoluble in most subterranean hydrocarbon-bearing formation fluids.

The degree of permeability reduction achieved by the process of the present invention will depend upon the concentration of the suspended precipitate in the aqueous solution injected into a subterranean formation, the amount of aqueous treating fluid injected into a subterranean formation and the specific precipitate employed. The concentration of the precipitate in the aqueous treating fluid can range from a lower limit of about 0.01 wt. % up to an upper limit of from about 20 wt. % to about 40 wt. %. The upper concentration limit will depend upon the concentration of a particular precipitate which may be suspended in an aqueous solution without appreciable settling and without deleteriously affecting the injectability of the aqueous treating solution.

The process of the present invention is employed to selectively reduce the permeability of a relatively highly permeable zone(s) of a subterranean formation so as to improve vertical conformance and flow profiles of fluids injected into or produced from the subterranean formation. The relatively highly permeable zone(s) is preferably isolated for injection utilizing mechanical zone isolation, i.e., utilizing conventional packer assemblies. The relatively highly permeable zone(s) is subsequently treated by injecting the aqueous treating solution of the present invention having an insoluble precipitate suspended therein. The aqueous treating solution penetrates the relatively highly permeable zone(s) until the insoluble precipitate is trapped in relatively small pore throat restrictions, for example, less than 10 microns. The insoluble precipitate initially trapped serves to divert and trap subsequently injected precipitate. It is believed that such entrapment produces a cascading effect which results in an in-depth permeability treatment. Thus, repeated applications of the process of the present invention results in a higher degree of permeability reduction.

Preferably, the process of the present invention is utilized to treat the environment near the injection surface, e.g. a well bore or a fracture, from which injected treating fluid enters a highly permeable zone of a subterranean formation. As utilized throughout this description, the term "environment near the injection surface" refers to the volume of a subterranean formation surrounding the surface from which injected fluid enters the formation, e.g. the well bore or fracture, which, as a general guide, usually extends a distance into the subterranean formation of up to about 3 meters from the injection surface. The environment near the injection surface may extend up to about 9 meters or more. Flow of fluids injected into or produced from a subterranean formation is predominantly influenced by this environment near the injection surface.

As also utilized throughout this description, the term "relatively highly permeable zone" refers to such a zone having a permeability greater than about 1 darcy but less than about 500 darcy. Further, as utilized throughout this description, the term "zone" is inclusive of strata and beds, whereas the term "fracture" is inclusive of channels and vugs. Injection of an aqueous treating solution having an insoluble precipitate suspended therein into a subterranean zone having a permeability less than about 1 darcy often results in plugging the face of the zone exposed to the injection surface. Mechanical zone isolation can be utilized to treat a highly permeable subterranean zone having fracture(s) present therein in accordance with the present invention as long as the fracture(s) does not intersect with another well bore.

The following examples are illustrative of the application of the process of the present invention with zone isolation and are not to be construed as limiting the scope thereof.

EXAMPLE 1

A 69 darcy, 14 cm, 20-30 mesh, Ottawa test sand, sand pack is placed in a glass burette. 60 ml of a 5.0 wt. % magnesium chloride solution is mixed with 40 ml of 5.0 wt. % sodium hydroxide solution. Tap water is utilized as the aqueous medium to derive both solutions. The resultant mixed solution containing magnesium hydroxide is utilized to flood the sand pack at a constant pressure drop of 12 psi. The permeability reduction ($k_{final}/k_{initial}$) achieved by injecting two pore volumes of the mixed treating solution is 0.0062. The treatment is repeated utilizing two pore volumes of the treating solution as aforedescribed. The resultant initial permeability reduction ($k_{final}/k_{initial}$) is 0.00010. As noted by visual observation, the treatment is evenly distributed throughout the sand pack. The treatment is permanent and is stable to substantial volumes of water, e.g., 35 pore volumes flooded through the treated sand pack for six days results in a ($k_{final}/k_{initial}$) of 0.00024.

EXAMPLE 2

A 19 darcy, 12.7 cm, 20-30 mesh, Ottawa test sand, sand pack is placed in a clear plastic tube. 60 vol. % of a 10 wt. % magnesium chloride solution is mixed with 40 vol. % of a 10 wt. % sodium hydroxide solution to form a first treating solution having magnesium hydroxide precipitate suspended therein. A second treating solution having magnesium hydroxide precipitate suspended therein is formed by mixing a 60 vol. % of a 15 wt. % magnesium chloride solution with 40 vol. % of a 15 wt. % sodium hydroxide solution. Tap water is utilized as the aqueous medium to derive all the solutions. The first and second aqueous treating solutions thus formed are utilized to flood the sand pack at a constant pressure drop of 13 psi. The fluid permeability is measured after each treatment. The treated sand pack is thereafter flooded with tap water over a prolonged period of time to determine the stability of the treatment. The results of this injection sequence are set forth in Table 1.

TABLE 1

| Fluid | Elapsed Time (Days) | Pore Volumes Injected | Final Permeability (k) (md) | $k_{final}/k_{initial}$ |
|---|---|---|---|---|
| 1st treating solution | 0 | 5.0 | 1.01 | 0.053 |
| 2nd treating solution | 0 | 1.21 | 0.00764 | 0.00040 |
| Tap water | 1.0 | 11.5 | 0.0182 | 0.0010 |
|  | 2.0 | 18.8 | 0.0297 | 0.0016 |
|  | 2.9 | 26.8 | 0.0398 | 0.0021 |

The extremely large permeability reduction achieved by this treatment significantly improves vertical conformance and flow profiles of subsequently injected fluids. The significant permeability reduction achieved by injection of the second aqueous treating solution is attributable in part to the increased concentration of magnesium hydroxide precipitate suspended therein. Additionally, the treatment is permanent and is stable to substantial volumes of water, e.g., approximately 27 pore volumes flooded through the treated sand pack for approximately 3 days still results in a permeability reduction ($k_{final}/k_{initial}$) of 0.0021.

EXAMPLE 3

The treated Ottawa test sand pack of Example 2 is flooded with tap water. The direction of fluid flow is reversed from that employed in Example 2 to simulate production flow from the sand pack. A constant pressure drop of 13 psi across the sand pack is employed during tap water injection. The results are set forth in Table 2.

TABLE 2

| Cumulative Pore Volumes of Tap Water Injected | Elapsed Time (Days) | Final Permeability (k) (md) | $k_{final}/k_{initial}$ |
|---|---|---|---|
| 1 | 0 | 2.67 | .15 |
| 10 | 1.0 | 4.78 | .25 |
| 13 | 2.0 | 4.65 | .25 |
| 16 | 3.3 | 4.84 | .25 |
| 19 | 4.0 | 4.80 | .25 |
| 22 | 5.0 | 4.76 | .25 |

From these results, it can be appreciated that, although the permeability reduction after 5 days of reverse tap water injection is 0.25 as compared to 0.0021 of the treated sand pack initially flooded to simulate injection flow, the permeability reduction is still significant enough to substantially improve the vertical conformance and flow profiles of produced fluids.

It is important to note that the permeability reduction effects of the process of the present invention can be reversed by the application of a mineral acid, such as, hydrochloric acid. Ammonium chloride which is inexpensive and readily available can also be employed in solution to dissolve the precipitate.

While the foregoing preferred embodiment of the invention has been described and shown, it is understood that all alternatives and modifications, such as those suggested, and others may be made thereto, and fall within the scope of the invention.

I claim:

1. A process for selectively reducing the permeability of at least one relatively highly permeable zone of a subterranean formation to improve vertical conformance and flow profiles of fluids injected into or produced from the subterranean formation, the formation being penetrated by a well bore in fluid communication therewith, the process comprising:

injecting via said well bore into said at least one relatively highly permeable zone in an environment near an injection surface, an aqueous solution having magnesium hydroxide suspended therein, said magnesium hydroxide significantly and relatively permanently reducing the permeability of said at least one relatively highly permeable zone.

2. The process of claim 1 wherein said subterranean formation is a subterranean hydrocarbon-bearing formation.

3. The process of claim 1 wherein the concentration of said magnesium hydroxide suspended in said aqueous solution is from about 0.01 wt. % to about 40 wt. %.

4. The process of claim 1 wherein said subterranean formation has more than one relatively highly permeable zone into which said aqueous solution is injected.

5. The process of claim 1 wherein said injection surface is defined by said well bore.

6. The process of claim 5 wherein said subterranean formation is a subterranean hydrocarbon-bearing formation.

7. The process of claim 1 wherein said injection surface includes at least one fracture present within said at least one highly permeable zone.

8. The process of claim 7 wherein said subterranean formation is a subterranean hydrocarbon-bearing formation.

* * * * *